United States Patent [19]

Schleinitz

[11] 4,251,377
[45] Feb. 17, 1981

[54] SEPARATION DEVICE OF CORDIERITE CERAMIC AND α-ALUMINA

[75] Inventor: Henry M. Schleinitz, Kennett Square, Pa.

[73] Assignee: E. I. Du Pont de Nemours and Company, Wilmington, Del.

[21] Appl. No.: 70,393

[22] Filed: Aug. 28, 1979

[51] Int. Cl.³ .................. B01D 31/00; B01D 13/00
[52] U.S. Cl. ............................ 210/510; 210/500.2; 210/650
[58] Field of Search ............... 210/510.23 F, 321 R, 210/500 M, 433 M; 106/68, 65, 62, 40 R; 65/2

[56] References Cited

U.S. PATENT DOCUMENTS

| | | | |
|---|---|---|---|
| 3,121,640 | 2/1964 | Miller, Jr. | 106/68 |
| 3,959,002 | 5/1976 | Esper | 106/65 |
| 3,991,254 | 11/1976 | Takeuchi | 106/62 X |
| 4,105,548 | 8/1978 | Baker et al. | 210/510 X |
| 4,117,055 | 9/1978 | Alexanderson | 106/40 R X |

*Primary Examiner*—Frank A. Spear, Jr.

[57] ABSTRACT

A ceramic filamentary structure particularly useful in ultrafiltration applications composed of cordierite ceramic and a quantity of α-alumina substantially in excess of that required to form the cordierite.

1 Claim, 1 Drawing Figure

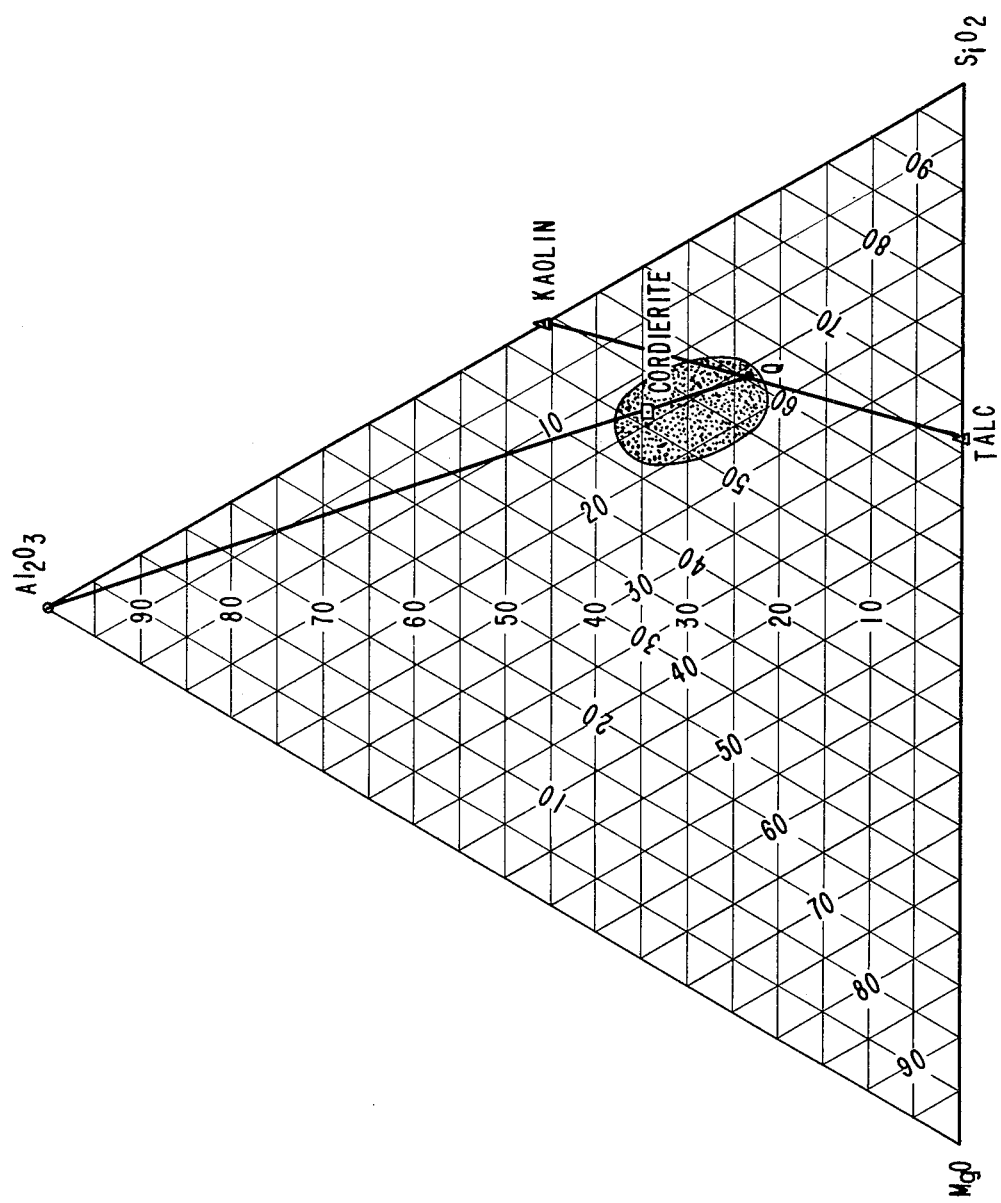

SEPARATION DEVICE OF CORDIERITE CERAMIC AND α-ALUMINA

BACKGROUND OF THE INVENTION

Ceramic ultrafiltration devices have been used in the past for filtering fine particles from a variety of fluids, including both gases and liquids, by the action of the pores in the walls of a hollow filament formed from the ceramic. In addition, the ceramic devices can be used in a reverse osmosis system, either as a separate pre-treatment device or as an integral part of the reverse osmosis apparatus, providing support for a reverse osmosis membrane formed on the surface of the ceramic ultrafiltration device.

Particularly advantageous techniques have recently been developed for the preparation of a three dimensional network of rigid, porous hollow filaments of inorganic material. The network is made by coating a continuous combustible core with a paste of the inorganic material, forming the resultant coated core into a network, followed by firing the coated core to burn off the core and consolidate the coating to a rigid porous hollow filament.

While previous ceramic structures have provided excellent performance, continuing effort has been directed to further improve the strength and flux characteristics of such ultrafiltration devices, and to provide greater control over the pore fraction and pore diameter in the hollow filaments.

SUMMARY OF THE INVENTION

The present invention provides hollow ceramic ultrafiltration devices that represent an outstanding balance of strength, flux and pore control characteristics compared to such devices which were previously available.

Specifically, the present invention provides, in a self-supporting, unitary structure comprising rigid, porous, inorganic hollow filament arranged in a three dimensional network of hollow filament, the hollow filament defining tortuous paths for fluid passing through the network, the improvement wherein the inorganic hollow filament comprises about from 5 to 50% cordierite ceramic and about from 95 to 50% α-alumina, the α-alumina being in excess of the stoichiometric proportion needed to form the cordierite ceramic.

BRIEF DESCRIPTION OF THE FIGURE

The FIGURE is a graphical illustration of the ceramic compositions of the present invention.

DETAILED DESCRIPTION OF THE INVENTION

The present invention is based on the discovery that ceramic ultrafiltration devices of the type described in U.S. Pat. No. 4,105,548, hereby incorporated by reference, are markedly improved if the ceramic component comprises about from 50 to 95% α-alumina, the α-alumina being in excess of the stoichiometric portion needed to form the cordierite ceramic. The balance of the ceramic component, 5 to 50%, is cordierite ceramic as hereinafter defined.

The ceramic hollow fibers of the present invention are prepared from a paste of inorganic material and binder material, as described in the patent previously incorporated by reference. The inorganic component of the paste comprises talc ($3MgO.4SiO_2.H_2O$), kaolin ($Al_2O_3.2SiO_2.2H_2O$) and alumina ($Al_2O_3$). The proportions of the talc and kaolin are adjusted to provide the atomic proportion of a cordierite ceramic having the approximate formula $2MgO.2Al_2O_3.5SiO_2$. The quantities of alumina included in the initial paste are such as to provide sufficient alumina to form the cordierite ceramic, and an excess to comprise about from 50 to 95% of the combination of α-alumina and cordierite ceramic after firing.

The particle size of the kaolin, talc and alumina used in the instant invention can vary widely, but affects the final properties of the ceramic. In general, the median particle size of all components is below 5 microns, and the presence of smaller particles can aid in the control of modal pore diameter in the final sintered product. For example, the presence of at least half of the alumina in a particle size of 0.5 microns results in a substantially lower modal pore diameter than if the entire quantity of alumina has a median particle size of about 3.5 microns.

The inorganic components of the present ceramic structures are blended with a binder material to form a paste, using the materials and quantities of binder substantially as described in the aforementioned U.S. Pat. No. 4,105,548. The paste is then applied to a continuous combustible core, the resulting coated core fabricated into a three-dimensional network and fired to burn off the core and consolidate the coating to a rigid porous hollow filament. Typically, firing temperatures of 1000° to 1500° C. can be used, and preferably 1200° to 1400° C. The times for firing can vary widely, depending on the equipment used and the configuration of the three-dimensional network. However, in general, a period of two to three hours within the desired temperature range is satisfactory, or a period of about 10 hours in a continuous kiln.

The proportions of inorganic components which can be used in the present invention are further illustrated by the figure. The figure is a compositional diagram of the components magnesium oxide (MgO), silicon dioxide ($SiO_2$) and alumina ($Al_2O_3$). Dehydrated kaolin and talc, respectively being composed of alumina and silicon dioxide and magnesium oxide and silicon dioxide, are indicated by the labeled triangles on the alumina-silicon dioxide and magnesium oxide-silicon dioxide lines, respectively. Kaolin and talc, combined in proportions such that the dehydrated species form the mixture with the composition indicated on the figure by point Q, combined with the appropriate proportion of alumina, result in the composition of cordierite, indicated by the labeled square. The exact proportions of ingredients for the composition of cordierite are 39.6% talc, 47.1% kaolin and 13.3% alumina, while the proportions of the dehydrated components, as shown on the Figure, are 41.2% talc, 44.3% kaolin and 14.5% alumina. The ingredients used to form the cordierite ceramic component of the present invention, however, can vary from the precise composition of cordierite to the extent shown by the ovoid shaded area on the compositional diagram. As these ingredients are fired, the talc and kaolin dehydrate and the components react to form a cordierite ceramic at temperatures in excess of 1000° C.

In the preparation of the products of the present invention, the firing is believed to effect a consolidation of the inorganic components at least in part through reaction of the chemical species present in the original inorganic mixture, and thus is distinct from solid state sintering in which consolidation is believed to occur by the elimination of interfaces between unreactive particles.

The inorganic component of the present invention represents a mixture of cordierite composition and additional α-alumina which substantially falls on the compositional line extending from the labelled square representing the composition of cordierite to the point indicating 100% alumina at the top of the figure, in which cordierite ceramic represents from 5 to 50% of the mixture of inorganic components.

The amount of unreacted α-alumina in the fired product of the present invention, representing about from 50 to 95% of the inorganic component, can be readily determined by conventional quantitative x-ray diffraction techniques.

The cordierite ceramic in the fired product of the present invention, representing about from 5 to 50% of the inorganic component, is a crystallographic combination of kaolin, talc and alumina, and can also be determined by x-ray diffraction techniques. The composition of the cordierite ceramic, as previously noted, can vary from the exact proportions of cordierite as shown by the shaded ovoid area on the Figure. Similarly, the crystallographic configuration of the cordierite ceramic can also vary, and be typical of cordierite itself, mullite, sapphirine, or other crystallographic forms based on kaolin, talc and alumina.

The porous hollow ceramic filaments of the present invention provide a marked improvement in physical characteristics over those prepared from cordierite alone or cordierite in combination with only a modest excess of alumina. The present compositions exhibit greater strength than cordierite compositions, higher flux than alumina compositions, and improved control of both pore fraction and pore diameter in the final hollow filaments over previously known hollow ceramic filaments.

The present invention is further illustrated by the following specific examples, in which parts and percentages are by weight unless otherwise indicated.

EXAMPLE 1

A ceramic composition was prepared from 52.8 parts of alumina having a median particle size of 3.5 μm with 90% of the particles being less than 8 μm; 8.5 parts of micronized talc, having a maximum particle size of 12 μm; 10.1 parts of kaolinite clay having a median particle size of 1.2 μm and 90% of the particles being smaller than 2.5 μm; and 28.6 parts of a solution containing 12.5% wt of an ethylene-vinyl acetate copolymer having about 28% vinyl acetate in perchloroethylene. The composition was prepared by blending the dry components manually, adding the mixture to the solution and blending in a heavy duty double arm mixer to obtain a uniform paste.

The above composition was extruded at room temperature through a 2.03 mm diameter coating die having an 0.81 mm outer diameter hollow tube centered in the die carrying a 400 μm outer diameter monofilament. The monofilament has a nominal 368 μm diameter core of poly(methylmethacrylate) and a 16 μm thick cladding of a copolymer of methyl methacrylate and a fluoroalkyl methacrylate.

The coated filament was wound up at 15.2 meters/minute (m/min) in a criss-cross manner on a 3.8 cm outer diameter mandrel covered with a 9.5 mm layer of refractory ceramic felt. The mandrel was wound for about 5.5 minutes using a constant tension textile wind-up having the traverse linked to the mandrel drive by gears. The tube made 5.13 revolutions for each complete cycle of the transverse. The traverse cycle (back and forth) was 40.6 cm. Every other layer of coated yarn was in the same direction of wrap but the layers were offset from one another to provide a tortuous path through the three-dimensional network structure. The bobbin of coated yarn was removed from the mandrel, placed on a 3.8 cm outer diameter mullite tube, and dried for 72 hours in the open air.

For more detailed testing, straight sections of coated filament were also prepared by suspending pieces vertically under slight tension to dry. The dry bobbin and straight sections of coated yarn were then fired to 1300° C. over a ten-hour period in a tunnel kiln and cooled. The product was a 19.8 cm long hollow cylinder (8.3 cm outer diameter, 4.4 cm inner diameter) of a single strand of hollow filament having a packing of 674 $m^2/m^3$. The straight hollow filament had an outer diameter of 1.97 mm and an inner diameter of approximately 0.37 mm, a bulk density of 1.742 $g/cm^3$, an apparent specific gravity of 3.49 $gm/cm^3$, apparent porosity of about 50%, modal pore diameter of 0.78 μm, pore volume of 0.194 $cm^3/gm$ and surface area of 1.47 $m^2/gm$.

Straight tube sections approximately 30 cm long were sealed in stainless steel tubing with an inlet and outlet, taking care to close one end of the ceramic tube bore and expose the other. Wilmington, Del., city water having a plug factor of about 80 was supplied to the annular space between the steel tubing and the ceramic tube at various pressures with a reject of approximately 40/ml/min. The flux was found to be between 40 and 50 gal/ft²-day-psig (277–347 $\times 10^{-6}$ m/sec-atm), and the plug factor of the effluent was 29 to 31.

The fired bobbin was potted with epoxy resin near one end to seal interfilament spaces and the core of the bobbin. The tubules on the short exposed end of the bobbin were broken away to expose the bores. The effective surface area of the remaining portion of the bobbin was 0.41 $m^2$. The potted bobbin, or cartridge, was mounted in a housing for ultrafiltration testing.

Wilmington, Del., city water having a plug factor of about 75 was passed through the completed device. The water was applied at an uncalibrated gauge pressure of 40 psig (276 kPa) and the test was conducted with no recirculation and no reject of feed water. The initial flow was 9.1 liters/min (136$\times 10^{-6}$ m/sec-atm) and the plug factor was 22. After 52 hours of continuous filtration without reject the flow declined to 4.4 liters/min (64$\times 10^{-6}$ m/sec-atm). In the interim the plug factor ranged from 22 to 25.

EXAMPLES 2–13

The procedure of Example 1 was repeated, except that the composition and process conditions were varied as shown in Table I and 16/4 cotton yarn was used as the combustible core. A short lead tube was used in the coating die, except for Example 4.

The data show a well-established control of the pore characteristics which control the flux and rejection in filters.

TABLE I

EXAMPLES 2-13

| EXAMPLE | | | 2 | 3 | 4 | 5 | 6 | 7 |
|---|---|---|---|---|---|---|---|---|
| COMPOSITION | | | | | | | | |
| Alumina | A17 | % w | 25.3 | 25.3 | 25.3 | 65.2 | 65.2 | 65.2 |
| | Al6SC | % w | 25.3 | 25.3 | 25.3 | 0 | 0 | 0 |
| Talc | D-707 | % w | 8.2 | 8.2 | 8.2 | 2.8 | 2.8 | 2.8 |
| Kaolin | K-10 | % w | 9.7 | 9.7 | 9.7 | 3.4 | 3.4 | 3.4 |
| Elvax ® Solution | | % w | 27.4 | 27.4 | 27.4 | 28.6 | 28.6 | 28.6 |
| Perclene | | % w | 4.1 | 4.1 | 4.1 | 0 | 0 | 0 |
| EXTRUSION | | | | | | | | |
| Die Diameter | | mm | 1.52 | 1.52 | 2.03 | 1.52 | 2.03 | 1.52 |
| Speed | | m/min | 21.3 | 21.3 | 18.3 | 21.3 | 18.3 | 21.3 |
| SINTERING | | | | | | | | |
| Temperature | | °C. | 1365 | 1260 | 1260 | 1260 | 1260 | 1365 |
| Cone | Orton | | PCE 13-14 | Small 6-7 | Small 6-7 | Small 6-7 | Small 6-7 | PCE 13-14 |
| PROPERTIES | | | | | | | | |
| Tube: O.D. | | mm | 1.69 | 1.76 | 2.00 | 1.68 | 1.99 | 1.75 |
| Bulk Density | | g/cm$^3$ | 2.27 | 1.90 | 1.90 | 2.10 | 2.10 | 2.16 |
| Ap. Specific Grav. | | — | 3.69 | 3.56 | 3.47 | 3.85 | 3.89 | 3.75 |
| Ap. Porosity | | % | 38.4 | 46.6 | 45.3 | 45.5 | 46.1 | 42.4 |
| Modal Pore Dia. | | μm | 0.50 | 0.48 | 0.46 | 0.49 | 0.52 | 0.62 |
| Pore Volume | | cm$^3$/gm | 0.122 | 0.187 | 0.187 | 0.168 | 0.171 | 0.147 |
| Surface Area | | m$^2$/gm | 1.4 | 2.6 | 3.0 | 2.9 | 2.1 | 1.2 |
| Short Beam Shear Str. | | MPa | 7.3 | 3.7 | 5.7 | 3.6 | 3.9 | 8.9 |
| Initial Flux | | $10^6$ × m/s-at. | 134 | 71 | 107 | 139 | 166 | 134 |
| Plug Factor | | — | 32 | 31 | 68 | 31 | 52 | 32 |
| Cartridge: | | | | | | | | |
| Packing | | m$^2$/m$^3$ | 820 | 855 | 876 | 855 | 872 | 893 |
| Area | | m$^2$ | 0.43 | 0.45 | 0.46 | 0.45 | 0.46 | 0.47 |
| Initial Flux | | $10^6$ × m/s-at. | 26 | 21 | 64 | 14 | 54 | 31 |
| Plug Factor (Init) | | — | 46 | 66 | 22 | 30 | 20 | 21 |
| (Ave) | | — | 21 | 25 | 33 | 26 | 26 | 26 |

| EXAMPLE | | | 8 | 9 | 10 | 11 | 12 | 13 |
|---|---|---|---|---|---|---|---|---|
| COMPOSITION | | | | | | | | |
| Alumina | A17 | % w | 50.7 | 50.7 | 50.7 | 31.3 | 31.3 | 31.3 |
| | Al6SG | % w | 0 | 0 | 0 | 31.3 | 31.3 | 31.3 |
| Talc | D-707 | % w | 8.2 | 8.2 | 8.2 | 2.7 | 2.7 | 2.7 |
| Kaolin | K-10 | % w | 9.7 | 9.7 | 9.7 | 3.2 | 3.2 | 3.2 |
| Elvax ® Solution | | % w | 27.4 | 27.4 | 27.4 | 27.4 | 27.4 | 27.4 |
| Perclene | | % w | 4.1 | 4.1 | 4.1 | 4.1 | 4.1 | 4.1 |
| EXTRUSION | | | | | | | | |
| Die Diameter | | mm | 2.03 | 1.52 | 2.03 | 2.03 | 2.03 | 1.52 |
| Speed | | m/min | 18.3 | 21.3 | 18.3 | 18.3 | 18.3 | 21.3 |
| SINTERING | | | | | | | | |
| Temperature | | °C. | 1365 | 1260 | 1365 | 1260 | 1365 | 1365 |
| Cone | Orton | | PCE 13-14 | Small 6-7 | PCE 13-14 | Small 6-7 | PCE 13-14 | PCE 13-14 |
| PROPERTIES | | | | | | | | |
| Tube: O.D. | | mm | 1.92 | 1.80 | 1.89 | 1.97 | 1.87 | 1.63 |
| Bulk Density | | g/cm$^3$ | 1.99 | 1.80 | 2.04 | 2.02 | 2.32 | 2.26 |
| Ap. Specific Grav. | | — | 3.50 | 3.46 | 3.54 | 3.72 | 3.73 | 3.74 |
| Ap. Porosity | | % | 43.2 | 47.9 | 42.4 | 45.7 | 37.7 | 39.5 |
| Modal Pore Dia. | | μm | 0.87 | 0.71 | 0.87 | 0.30 | 0.36 | 0.31 |
| Pore Volume | | cm$^3$/gm | 0.163 | 0.201 | 0.161 | 0.167 | 0.108 | 0.121 |
| Surface Area | | m$^2$/gm | 1.1 | 1.7 | 1.1 | 3.7 | 1.7 | 2.2 |
| Short Beam Shear Str. | | MPa | 7.6 | 4.1 | 8.0 | 5.7 | 11.5 | 10.0 |
| Initial Flux | | $10^6$ × m/s-at. | 237 | 220 | 182 | 37 | 31 | 25 |
| Plug Factor | | — | 35 | 34 | 21 | 23 | 31 | 32 |
| Cartridge: | | | | | | | | |
| Packing | | m$^2$/m$^3$ | 921 | 917 | 826 | 862 | 818 | 841 |
| Area | | m$^2$ | 0.48 | 0.48 | 0.43 | 0.45 | 0.43 | 0.44 |
| Initial Flux | | $10^6$ × m/s-at. | 61 | 45 | 65 | 18 | 17 | 12 |
| Plug Factor (Init) | | — | 18 | 18 | 25 | 72 | 52 | 21 |
| (Ave) | | — | 27 | 21 | 26 | 38 | 33 | 23 |

EXAMPLE 14 AND COMPARATIVE EXAMPLES A AND B

In Example 14, the procedure of Example 1 was repeated, except as noted in Table II, at the same time and under the same test conditions as Comparative Examples A & B.

In Comparative Example A, the general procedure of Example 14 was repeated, using as the inorganic components the elements of Example 5 of U.S. Pat. No. 4,105,548. The ceramic composition for extrusion was made of 11.4 parts of α-alumina particles, 22.3 parts of talc, 18.1 parts of kaolin and 48.1 parts of the copolymer solution of Example 14.

The properties of the ceramic and the filtration performance are reported in Table II. The strength of the tubules is very much lower and the flux of tubules is not only much lower initially but also declines at a much faster rate than Example 14. The flux from the cartridge of this composition is also lower than from the cartridge of Example 14. The high plugging factors and low rate of flux decline for the cartridge of Comparative Example A suggest that undetected broken tubules may exist within the network structure.

In Comparative Example B, the general procedure of Example 14 was repeated, using as the inorganic components the elements of Example 1 of U.S. Pat. No. 4,105,548. The ceramic composition for extrusion was made of 75.3 parts of A-17 alumina, 17 parts of the copolymer solution of Example 14, 1.3 parts of a silicone oil (Dow Corning 550 fluid), and 6.4 parts of perchloroethylene. The paste was extruded through a 2.03 mm diameter coating die having a 0.64 mm inner diameter guide tube carrying a twisted cotton yarn of about 1250 denier (4 ends of 16 cotton count yarn).

The coated yarn was wound up at 13.7 meters/minute. The properties of the ceramic and the filtration performance are reported in Table II. By comparison with Example 14, the initial flux is much lower for both tubules and cartridges. The filtration performance is similar.

TABLE II

| EXAMPLE | | | 14 | A | B |
|---|---|---|---|---|---|
| COMPOSITION | | | | | |
| Alumina | A17 | % w | 52.8 | 0.0 | 75.3 |
|  | Al6SG | % w | 0.0 | 11.4 | 0.0 |
| Talc | D-707 | % w | 8.5 | 22.3 | 0.0 |
| Kaolin | K-10 | % w | 10.1 | 18.1 | 0.0 |
| Elvax ® Solution | | % w | 28.6 | 48.2 | 17.0 |
| Perclene | | % w | 0.0 | 0.0 | 6.4 |
| Silicone Oil | Dow 550 | % w | 0.0 | 0.0 | 1.3 |
| EXTRUSION | | | | | |
| Die Diameter | | mm | 2.03 | 2.03 | 2.03 |
| Speed | | m/min | 15.2 | 15.2 | 13.7 |
| Time | | min | 8.0 | 8.0 | 10.0 |
| SINTERING TEMPERATURE | | °C. | 1310 | 1310 | 1310 |
| PROPERTIES | | | | | |
| Tube: O.D. | | mm | 1.91 | 1.87 | 2.17 |
| Bulk Density | | g/cm$^3$ | 1.72 | 1.43 | 2.34 |
| Ap. Porosity | | % | 50.8 | 46.8 | 41.6 |
| Modal Pore Dia. | | μm | 0.79 | 7.7 | 0.34 |
| Pore Volume | | cm$^3$/gm | 0.227 | 0.107 | 0.139 |
| Surface Area | | m$^2$/gm | 1.66 | 0.75 | 2.35 |
| Short Beam Shear Str. | | MPa | 4.2 | 2.0 | 4.5 |
| Initial Flux | | $10^6$ × m/s-at. | 301 | 97 | 74 |
| Plug Factor | | | — | 43 | 44 |
| Bubble Pressure (Lowest) | | kPa | 220 | 21 | 124 |
| Cartridge: | | | | | |
| Packing | | m$^2$/m$^3$ | 638 | 695 | 787 |
| Area | | m$^2$ | 0.56 | 0.59 | 0.72 |
| Initial Flux | | $10^6$ × m/s-at. | 126 | 33 | 19.4 |
| Plug Factor (Ave) | | | — | 35 | 60 | 35 |

EXAMPLE 15

The general procedures of Example 1 were repeated, except that the quantities of α-alumina were adjusted to provide a final composition in which the excess α-alumina and cordierite ceramic each represented about 50% of the finished ceramic. A ceramic structure was prepared and tested as in Example 1, and the results are summarized in Table III.

TABLE III

| EXAMPLE | | | |
|---|---|---|---|
| COMPOSITION | | | |
| Alumina | A17 | 37.3 wt % | 2577.1 gms. |
|  | Al6SG | 0 | 0 |
| Talc | D-707 | 14.1 wt % | 972.2 gms. |
| Kaolin | K-10 | 16.8 wt % | 1158.5 gms. |
| Elvax ® Solution | | 31.8 wt % | 2200.0 gms. |
| Perclene | | 0 | 0 |
| Silicone Oil | | 0 | 0 |
| EXTRUSION | | | |
| Die Diameter | | 2.03 mm | .080" |
| Speed | | 13.7 m/min. | 45'/min. |
| Time | | 6.25 min. | 6.25 |
| SINTERING TEMPERATURE | | 1300° C. | |
| PROPERTIES | | | |
| Tube: O.D. | | 1.96 mm | |
| Bulk Density | | 1.727 ± .078 g/cm$^3$ | |
| Ap. Spec. Grav. | | 3.245 ± 0.0006 | |
| Ap. Porosity | | 0.468 ± 0.024 % | |
| Modal Pore Dia. | | 1.2 μm | |
| Pore Volume | | 0.2188 cm$^3$/g | |
| Surface Area | | 1.133 m$^2$/g | |
| Short Beam Shear Str. | | 5.63 MPa | |
| Initial Flux | | 485 $10^6$ × m/sec-at. | |
| Plug Factor | | 24–30 | |
| Cartridge: | | | |
| Packing | | 718 m$^2$/m$^3$ | |
| Area | | 0.529 m$^2$ | |
| Initial Flux | | 105 $10^6$ × m/sec-at. | |

TABLE III-continued

| EXAMPLE | |
|---|---|
| Plug Factor (Ave) | 23 |

I claim:
1. In a self-supporting, unitary structure comprising rigid, porous, inorganic hollow filament arranged in a three-dimensional network of hollow filament, the hollow filament defining tortuous paths for fluid passing through the network, the improvement wherein the inorganic hollow filament comprises complementarily about from 5 to 50% cordierite ceramic and about from 95 to 50% α-alumina, the α-alumina being in excess of the stoichiometric proportion needed to form the cordierite ceramic.

* * * * *